ated July 6, 1948

UNITED STATES PATENT OFFICE 2,444,594

ISOPROPYLIDENE-p-PHENOXY-2-ETHANOL-p-PHENOXYACETIC ACID

Harold M. Day, Cos Cob, and David W. Jayne, Jr., Old Greenwich, Conn., assignors to American Cyanamid Company, New York, N. Y., a corporation of Maine No Drawing. Application August 7, 1947, Serial No. 767,335

1 Claim. (Cl. 260—520)

This invention relates to a new chemical compound and to a process according to which this compound may be prepared. More particularly, the invention relates to a high molecular weight hydroxy carboxylic acid which is a derivative of isopropylidene diphenol.

The compound of the present invention may be represented by the following formula:

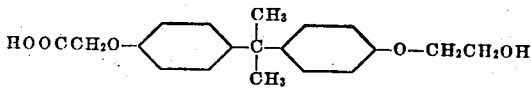

It is prepared by bringing about reaction between an alkali metal salt of isopropylidene diphenol, a halohydrin, and an alkali metal salt of a haloacetic acid. The free acid is then obtained by treatment of the resulting alkali metal salt with an acid.

The invention will be described in greater detail in conjunction with the following specific examples in which the proportions are given in parts by weight.

Example 1

| | Parts |
|---|---|
| Monopotassium salt of isopropylidene diphenol _____ (1 mol) __ | 262 |
| Ethylene chlorohydrin _____ (1 mol) __ | 80.5 |
| Potassium hydroxide ____ (1 mol as KOH) __ | 64 |
| Potassium monochloracetate ____ (1 mol) __ | 133 |

The monopotassium salt of isopropylidene diphenol and the ethylene chlorohydrin in alcohol are heated under reflux for about 4 hours. Potassium chloride which is formed is separated from the alcohol solution by filtration. The potassium hydroxide and an alcoholic slurry of the potassium monochloracetate are then added to the filtered alcohol solution, and the mixture is heated under reflux for about 5 hours. The solution is then evaporated nearly to dryness, the residue is dissolved in water, and the solution is acidified with dilute hydrochloric acid. The oil so obtained is extracted from the water with ether, the ether solution is treated with anhydrous sodium sulfate, and the ether is then evaporated. A light yellow oil which is isopropylidene p-phenoxyethanol p-phenoxyacetic acid is obtained.

Example 2

| | Parts |
|---|---|
| Isopropylidene diphenol _____ (1 mol) __ | 228 |
| Sodium hydroxide in 1000 parts of water _____ (1 mol) __ | 41.5 |
| Ethylene chlorohydrin _____ (1 mol) __ | 80.5 |
| Potassium hydroxide in 200 parts of water _____ (1 mol as KOH) __ | 64 |
| Potassium hydroxide in 300 parts of water _____ (1 mol as KOH) __ | 64 |
| Monochloracetic acid in 300 parts of water _____ (1 mol) __ | 94.5 |
| Concentrated sulfuric acid _____ | 100 |

The isopropylidene diphenol is added to the solution of sodium hydroxide. The ethylene chlorohydrin is added and the resulting solution refluxed for 1 hour. The oil which comes out of solution is redissolved by adding the 64 parts of potassium hydroxide dissolved in 200 parts of water.

The 64 parts of potassium hydroxide in 300 parts of water is added to the aqueous monochloracetic acid solution and the resulting potassium chloracetate solution is added to the reaction mixture obtained from the diphenol and the ethylene chlorohydrin as described in the preceding paragraph.

This mixture is refluxed for 3 hours, the solution is then cooled, and the sulfuric acid is added. The oil which separates is decanted from the water, dissolved in ether and dried with anhydrous sodium sulfate. When the ether is evaporated a clear pale yellow oil comprising isopropylidene p-phenoxyethanol p-phenoxyacetic acid is obtained.

Example 3

Example 2 is repeated reversing the order of reaction of ingredients; in other words, the monosodium salt of isopropylidene diphenol is first reacted with the potassium chloracetate solution and the ethylene chlorohydrin is then added to the reaction product so obtained.

Any alkali metal salt of isopropylidene diphenol or of one of its derivatives or of the haloacetic acid may be used in the preparation of our new product according to the process of the present invention. Sodium and potassium salts, being the most readily available, are preferred but the invention is not limited to this preferred modification. Mixed salts or mixtures of different salts, i. e., the sodium-potassium isopropylidene diphenolate or a mixture of sodium isopropylidene diphenolate and potassium isopropylidene diphenolate, respectively, may also be used as will be apparent from Example 2 which described the reaction of the sodium salt of isopropylidene diphenol with the potassium salts of the intermediate and of monochloracetic acid.

Ethylene halohydrins and salts of haloacetic acids other than the chlorine homologs may be used with equal success. The corresponding brom- or iodo-compounds are suitable but because of their greater ease of handling, lower cost and availability, the chlorine compounds are preferred. The invention is not, of course, limited to the use of these chlorine compounds. It is also possible to use a mixture of different ethylene halohydrins or haloacetates, particularly when a single pure product is not necessarily desired.

It will be seen from the specific examples that the process of the present invention may be carried out in aqueous or alcoholic media.

If desired, a catalytic quantity of potassium iodide or other substance such as sodium or potassium bromide, sodium iodide, etc., may be added to the reaction mixture.

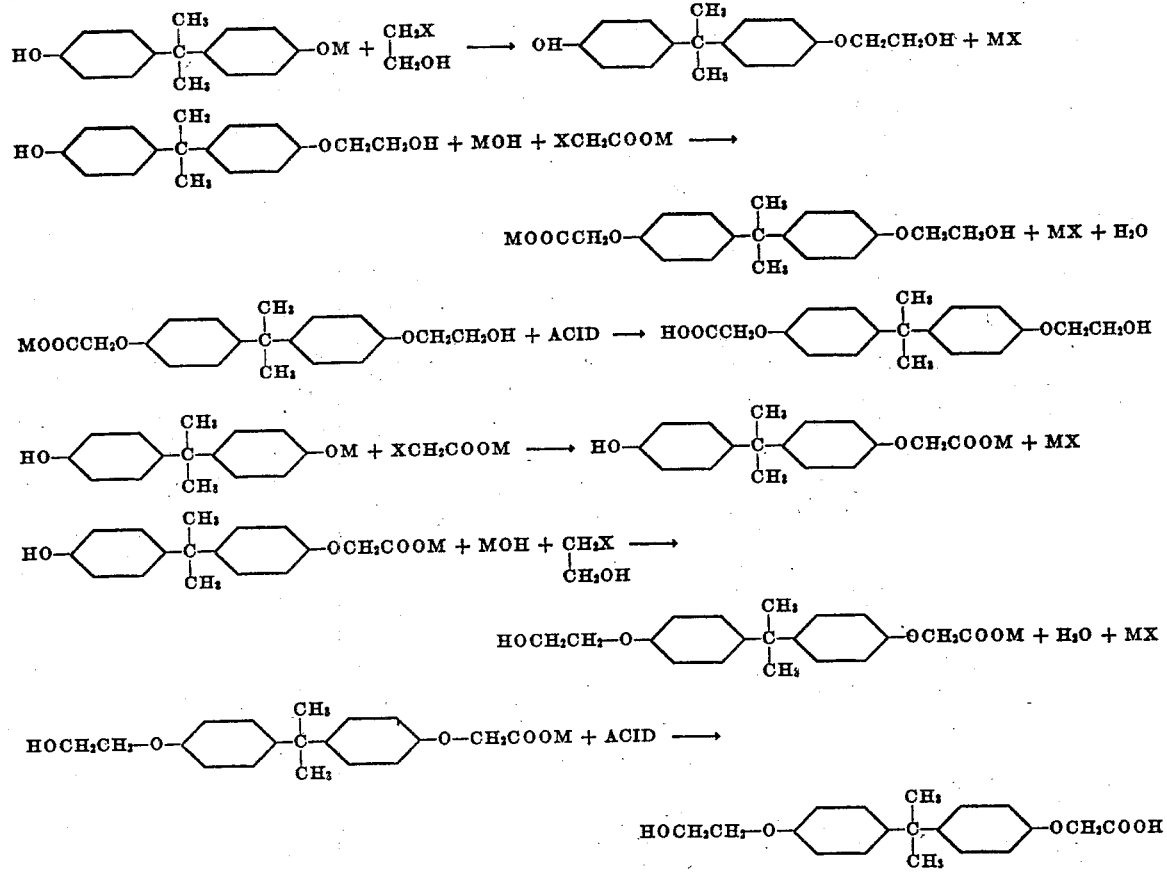

The product of the present invention is a high molecular weight hydroxy carboxylic acid and as such is adaptable to many interesting applications. Upon self-condensation, the hydroxy acid forms condensation products which may be drawn into fibers. Condensation products may be prepared which are hard and glassy, soluble in toluene but not in alcohol. The hydroxy carboxylic acid of the present invention may also be used in the preparation of resinous materials by reaction with other alcohols and/or acids and particularly with polyhydric alcohols such as glycerol and/or polycarboxylic acids such as phthalic acid, sebacic acid, maleic and fumaric acids and the like.

It is believed that the process of the present invention follows either of the courses represented by the following general equations, depending upon the order of addition of reactants:

where M is alkali metal and X is halogen. It should be understood, however, that these equations represent merely a theory of mechanism of reaction to which we do not wish to be limited.

We claim:

Isopropylidene-p-phenoxy-2-ethanol - p - phenoxyacetic acid having the formula

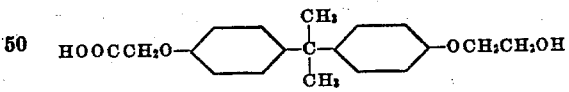

HAROLD M. DAY.
DAVID W. JAYNE, Jr.